(12) United States Patent
Lee et al.

(10) Patent No.: US 8,797,022 B2
(45) Date of Patent: Aug. 5, 2014

(54) ULTRA-SLIM SENSOR DEVICE AND MANUFACTURING METHOD THEREOF

(75) Inventors: Chung Kook Lee, Daejeon (KR); Young Seong Wang, Daejeon (KR); Cheol Jin Jeong, Buyeo-gun (KR)

(73) Assignee: Lattron Co., Ltd., Daejeon (KR)

( * ) Notice: Subject to any disclaimer, the term of this patent is extended or adjusted under 35 U.S.C. 154(b) by 183 days.

(21) Appl. No.: 13/417,884

(22) Filed: Mar. 12, 2012

(65) Prior Publication Data

US 2012/0235669 A1  Sep. 20, 2012

(30) Foreign Application Priority Data

Mar. 16, 2011 (KR) .................. 10-2011-0023219

(51) Int. Cl.
*G01R 1/04* (2006.01)
(52) U.S. Cl.
USPC .......................................... 324/156; 374/208
(58) Field of Classification Search
CPC ........ G01D 11/245; G01J 5/041; G01J 5/044; G01K 1/08; G01K 1/14
USPC ......................................... 324/156; 73/866.5
See application file for complete search history.

(56) References Cited

U.S. PATENT DOCUMENTS

| | | | |
|---|---|---|---|
| 4,079,350 A * | 3/1978 | Sentementes et al. ...... | 338/22 R |
| 8,511,185 B2 | 8/2013 | Lee et al. | |
| 2004/0227258 A1 * | 11/2004 | Nakatani ........................ | 257/787 |
| 2009/0057789 A1 * | 3/2009 | Huang et al. ................... | 257/414 |
| 2010/0067562 A1 * | 3/2010 | Wakabayashi ................ | 374/208 |
| 2010/0178501 A1 * | 7/2010 | Masuko et al. ............ | 428/355 N |
| 2011/0277570 A1 * | 11/2011 | Lee et al. ...................... | 73/866.5 |
| 2012/0258354 A1 * | 10/2012 | Yamaguchi et al. .......... | 429/176 |

FOREIGN PATENT DOCUMENTS

| | | |
|---|---|---|
| JP | H07286911 A | 10/1995 |
| JP | H08128901 A | 5/1996 |
| KR | 100887540 B1 | 3/2009 |
| KR | 20100007417 U | 7/2010 |
| WO | WO 2010047503 A2 * | 4/2010 |
| WO | WO 2010082712 A1 * | 7/2010 |

* cited by examiner

*Primary Examiner* — Melissa Koval
*Assistant Examiner* — Daniel Miller
(74) *Attorney, Agent, or Firm* — Drinker Biddle & Reath LLP

(57) ABSTRACT

An ultra-slim sensor device, comprising: a sensor element; lead wires (or lead frames) connected to the sensor element; a support for protecting the sensor element and the lead wires disposed therein; and upper and lower films disposed on upper and lower sides of the sensor element, the lead wires and the support to insulate them, wherein a thickness of the support is greater than that of the sensor element in order to protect the sensor element and the lead wires from external shocks, and the support gradually becomes thin toward the end thereof such that the upper and lower films come into contact with each other in order to remove a space between the upper and lower films.

6 Claims, 3 Drawing Sheets

ULTRA-SLIM SENSOR DEVICE AND MANUFACTURING METHOD THEREOF

CROSS-REFERENCE TO RELATED APPLICATION

This application claims the priority of Korean Patent Application No. 10-2011-0023219, filed Mar. 16, 2011 in the Korean Patent Office, which is incorporated herein by reference in its entirety.

FIELD OF THE INVENTION

The invention relates to an ultra-slim sensor device and a method of manufacturing the same.

BACKGROUND

Generally, electronic appliances, such as portable terminals, notebooks, portable multimedia players (PMPs), digital cameras, digital camcorders and the like, are provided with a chargeable and dischargeable battery pack such that they can be used while being carried.

The battery pack is provided therein with a temperature sensor device in order to protect batteries by detecting the temperature thereof when lithium ion cells are discharged.

FIG. 1 is a view showing a conventional sensor device, and FIG. 2 is a perspective view showing the improved conventional device of FIG. 1.

As shown in FIGS. 1 and 2, the conventional sensor device is configured such that a sensor element 10 is fixed between lead frames 11 and is covered with an insulating film to insulate the sensor element 10 from the lead frames 11.

However, the conventional sensor device is problematic in that it is not sufficiently protected from external shocks such as impact, compression and the like, which may break the sensor element 10. Particularly, when the sensor device is mounted on a battery cell of a notebook and then the battery cell is pressed by a plastic pack, there is a problem in that the sensor device is damaged by shocks.

Therefore, as shown in FIG. 2, the invention provides a support 230 in order to protect the sensor element 210. However, there is also a problem in that shocks are transferred to the sensor element 210 when the support 230 is thin, and the upper and lower films are spaced apart from each other around the support 230 when the support 230 is thick, so that liquid is introduced into the gap therebetween, with the result that the sensor element becomes damaged.

Particularly, such a problem has a great influence on reliability especially in terms of voltage characteristics.

SUMMARY

Accordingly, the invention has been devised to solve the above-mentioned problems, and an embodiment of the invention protects a sensor element from external shocks by providing a support.

Another embodiment of the invention prevents films from becoming spaced apart by providing a support having an inclination.

An embodiment of the invention provides an ultra-slim sensor device, including: a sensor element; lead wires (or lead frames) connected to the sensor element; a support for protecting the sensor element and the lead wires disposed therein; and upper and lower films disposed on upper and lower sides of the sensor element, the lead wires and the support to insulate them, wherein a thickness of the support is greater than that of the sensor element in order to protect the sensor element and the lead wires from external shocks, and the support gradually becomes thin toward the end thereof such that the upper and lower films come into contact with each other in order to remove a space between the upper and lower films.

The ultra-slim sensor device may further comprise a silicon layer applied on the sensor element and the lead wires.

In the ultra-slim sensor device, the support may be made of any one of a ceramic, a polymer and a metal coated with an insulating material.

In the ultra-slim sensor device, each of the upper and lower films may be a polymer film, the polymer film may be made of any one of polyimide, polyester and teflon, and the polymer film may be integrated by thermocompression bonding.

Another embodiment of the invention provides a method of manufacturing an ultra-slim sensor device, including the steps of: connecting a sensor element with lead wires; disposing the sensor element connected with the lead wires inside a support; covering the sensor element disposed inside the support with upper and lower films; and pressing the upper film using a press at 100~250 ° C., wherein a thickness of the support is greater than that of the sensor element in order to protect the sensor element and the lead wires from external shocks, and the support gradually becomes thin toward the end thereof such that the upper and lower films come into contact with each other in order to remove a space from between the upper and lower films.

The method may further comprise the step of applying a silicon layer onto the sensor element and the lead wires to cover them.

BRIEF DESCRIPTION OF THE DRAWINGS

The above and other embodiments, features and advantages of the invention will be more clearly understood from the following detailed description taken in conjunction with the accompanying drawings, in which.

DETAILED DESCRIPTION

Hereinafter, embodiments of the invention will be described in detail with reference to the attached drawings.

Figure 1:
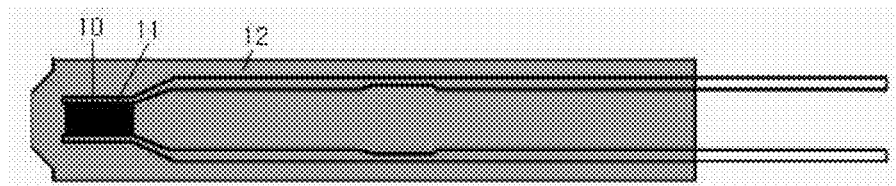
FIG. 1 is a view showing a conventional sensor device.
Figure 2:
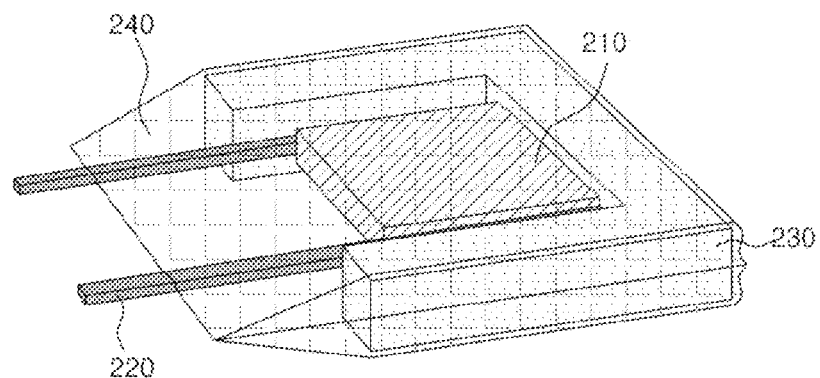
FIG. 2 is a perspective view showing the improved conventional device of FIG. 1.
Figure 3:
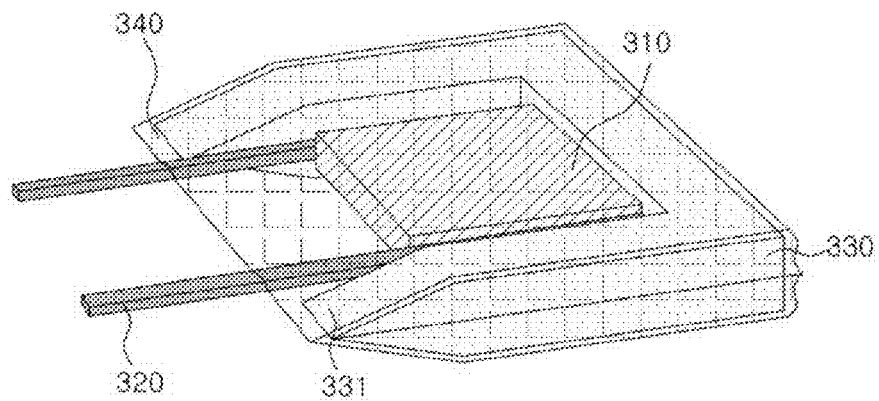
FIG. 3 is a perspective view showing an ultra-slim sensor device according to an embodiment of the invention.
Figure 4:
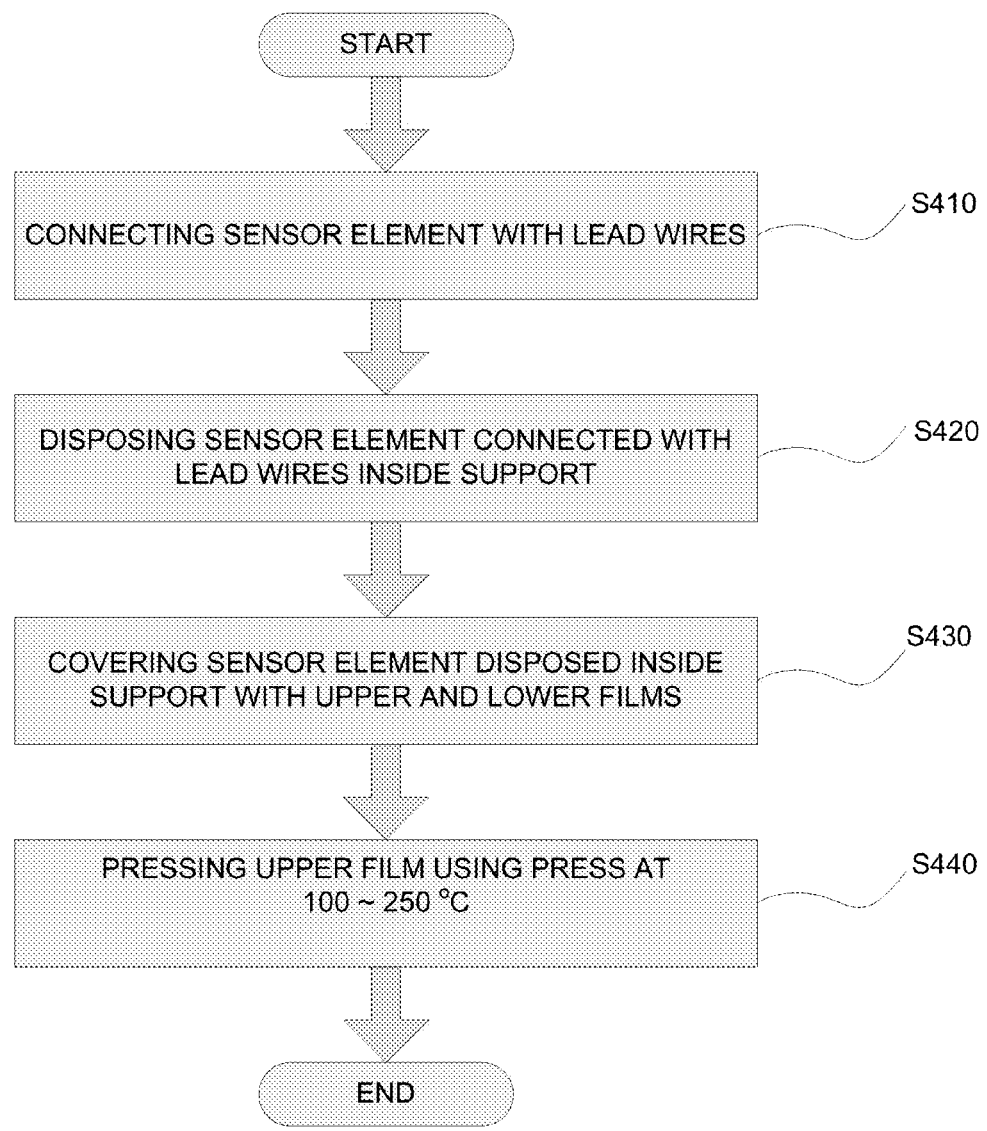
FIG. 4 is a flowchart showing a method of manufacturing an ultra-slim sensor device according to an embodiment of the invention.
Figure 5:
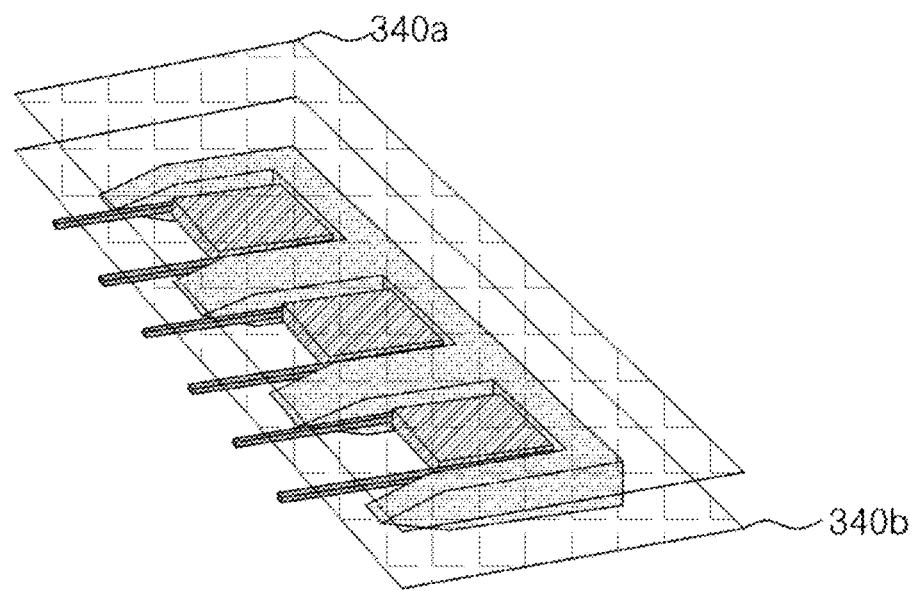
FIG. 5 is a view showing a method of simultaneously manufacturing a plurality of ultra-slim sensor devices according to an embodiment of the invention.

FIG. 3 is a perspective view showing an ultra-slim sensor device according to an embodiment of the invention, FIG. 4 is a flowchart showing a method of manufacturing an ultra-slim sensor device according to an embodiment of the invention, and FIG. 5 is a view showing a method of simultaneously manufacturing a plurality of ultra-slim sensor devices according to an embodiment of the invention.

As shown in FIG. 3, the ultra-slim sensor device of the invention comprises a sensor element 310, lead wires 320, a support 330, and a film 340.

Typically, the sensor element 310 may be a sensor element for detecting temperature, but may comprise any sensor element that needs to be protected from shocks.

The lead wires 320 are fixed to the sensor element 320 interposed therebetween. The lead wires 320 are fixed to the sensor element 310 by soldering.

Lead frames may be used instead of the lead wires 320.

Meanwhile, a silicon layer (not shown) may further be formed on the sensor element 310 provided with the lead wires 320 by applying silicon having excellent air tightness and elasticity onto the sensor element 310. The silicon layer serves to prevent liquid components from being introduced into the sensor element 310 because the silicon layer is uniformly spread and is thus charged in the gap between the sensor element 310 and the support 330, and serves to additionally protect the sensor element 310 from the mechanical shocks applied to the sensor element 310.

The sensor element 310 and the lead wires 320 are disposed inside the support 330. The thickness of the support 330 is larger than that of the sensor element 310 such that the sensor element 310 is protected from external shocks.

In the ultra-slim sensor device according to an embodiment of the invention, the thickness of the support 330 is larger than that of the sensor element 310 by at least 0.05 mm. For example, when the thickness of the sensor element 310 is 0.2 mm, the thickness of the support 330 may be 0.25 mm.

Where the thickness of the support 330 is more than the above-thickness, a lifting phenomenon occurs when the support 330 does not have gradually-thinned portions.

In order to remove the space between an upper film 340a and a lower film 340b with the support disposed therebetween, the thickness of the support 330 is gradually decreased toward the end thereof to provide the support with an inclination 331, and the inclination 331 is formed after passing though one side of the sensor element 310. Owing to the inclination 331, shocks are not applied to the sensor element 310.

Meanwhile, in the embodiment of the invention, the support 330 is formed in an open box shape to protect the sensor element 310. However, the support 330 may be formed in various shapes as long as they can protect the sensor element 310.

Further, the support 330 is made of any one of a ceramic, a polymer and a metal coated with an insulating material.

Typical examples of the polymer may comprise polycarbonate, polyethylene, polyamide, polypropylene and the like. Particularly, when the support is made of a thermoplastic polymer, although the support does not have an inclination in the early stage, the support will deform during the thermocompression bonding process, and thus the inclination is naturally formed.

The film 340 is a polymer film including an insulating material or an insulating layer. The film 340 may be made of any one of polyimide, polyester and teflon.

The polymer film is integrated by thermocompression bonding.

The polymer film may be coated with an adhesive.

Hereinafter, a method of manufacturing the above-mentioned ultra-slim sensor device will be described.

As shown in FIGS. 4 and 5, first, lead wires 320 are connected with a sensor element 310 (S310). The sensor element 310 is disposed between the ends of the lead wires 320.

Subsequently, the head of the sensor element 310 connected with the lead wires 320 is coated with liquid silicon, dried and then cured.

Subsequently, the sensor element 310 connected with the lead wires 320 is disposed at the inner side of a support 330 (S320). The thickness of the support 330 is greater than that of the sensor element 310 in order to protect the sensor element 310 and the lead wires 320 from external shocks, and the thickness of the support 330 gradually decreases toward the end thereof to provide the support 330 with an inclination 331 in order to remove the space between the upper film 340a and the lower film 340b.

Owing to the inclination 331, it is possible to prevent the upper film 340a and the lower film 340b from becoming spaced apart from each other, thus preventing leakage. Subsequently, the upper and lower films 340a and 340b are respectively provided on the upper and lower sides of the sensor element disposed at the inner side of the support 330.

Finally, the upper film 340a is pressed by a press of 100~250 ° C.

When the support 330 is made of a thermoplastic polymer, the inclination 331 can be naturally formed such that the end of the open box-shaped support 33 having uniform thickness gradually becomes thin depending on the pressing condition.

In the embodiment of the invention, the press is operated at a pressure range of 5~30 $kg_f$.

A plurality of sensor devices can be formed by repeatedly performing the above-mentioned sensor device manufacturing process. However, in order to simultaneously form the plurality of sensor devices 310, as shown in FIG. 5, each of the sensor elements 310 is connected with lead wires 320.

Subsequently, each of the sensor elements 310 connected with the lead wires 320 is disposed at the inner side of the support 330.

Subsequently, the sensor elements 310 disposed on the inner side of the support 330 are serially arranged on the lower film 340b.

Subsequently, the sensor elements 310 arranged on the lower film 340b are covered with the upper film 340a.

Finally, the upper film 340a is pressed by a press of 150~200 ° C., and is then cut individually.

As described above, according to an embodiment of the invention, the shocks applied to the sensor device occurring when films for covering the sensor device are formed using the support can be reduced, thus preventing the sensor device from becoming broken.

Further, according to an embodiment of the invention, it is possible to prevent the films covering the support from becoming spaced apart from each other, thus preventing leakage.

Although various embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A sensor device, comprising:
a sensor element;
lead wires connected to the sensor element;
a support surrounding the sensor element with the lead wires and exposing an upper surface and a lower surface of the sensor element, wherein the support protects the sensor element and the lead wires; and
an upper film disposed on the upper surface of the sensor element and a lower film disposed on the lower surface of the sensor element and on a lower surface of the support,
wherein the support has an upper surface of a height greater than a height of the upper surface of the sensor element in order to protect the sensor element and the lead wires from external shocks, and
wherein the support gradually becomes thinner toward an end of the support along an extended direction of the lead wires such that the upper and lower films come into contact with each other in order to remove a space between the upper film and lower film.

2. The sensor device according to claim 1, further comprising: a silicon layer applied on the sensor element and the lead wires.

3. The sensor device according to claim 1, wherein the support is made of any one of a ceramic, a polymer and a metal coated with an insulating material.

4. The sensor device according to claim 1, wherein each of the upper and lower films is a polymer film, the polymer film being made of any one of polyimide, polyester and teflon, and the polymer film is integrated by thermocompression bonding.

5. A method of manufacturing a sensor device, comprising:
connecting a sensor element with lead wires;
disposing the sensor element connected with the lead wires inside a support, wherein the support exposes an upper surface and a lower surface of the sensor element;
disposing an upper film on an upper surface and a lower film on a lower surface of the support to cover the sensor element disposed inside the support; and
pressing the upper film using a press at a temperature of 100-250° C.,
wherein the upper surface of the support has a height greater than a height of the upper surface of the sensor element in order to protect the sensor element and the lead wires from external shocks, and
wherein the support gradually becomes thinner toward an end of the support along an extended direction of the lead wires such that the upper and lower films come into contact with each other in order to remove a space from between the upper film and lower film.

6. The method according to claim 5, further comprising applying a silicon layer onto the sensor element and the lead wires to cover them.

* * * * *